United States Patent
Döragrip

Patent Number: 5,365,899
Date of Patent: Nov. 22, 1994

[54] VALVE ARRANGEMENT FOR AN INTERNAL COMBUSTION ENGINE

[75] Inventor: Gustaf F. A. Döragrip, Tenhult, Sweden

[73] Assignee: Aktiebolaget Electrolux, Sweden

[21] Appl. No.: 56,831

[22] Filed: May 3, 1993

[30] Foreign Application Priority Data

May 6, 1992 [SE] Sweden ................. 9201421

[51] Int. Cl.⁵ ............................................. F02B 75/06
[52] U.S. Cl. ............................. 123/192.2; 123/73 D
[58] Field of Search ................ 123/73 R, 73 D, 65 V, 123/192.2

[56] References Cited

FOREIGN PATENT DOCUMENTS 58-62318  4/1983  Japan ........................... 123/73 R Primary Examiner—Noah P. Kamen
Attorney, Agent, or Firm—Pearne, Gordon, McCoy & Granger

[57] ABSTRACT

A two-stroke engine having a crankcase (10) with a crankshaft (11), a cylinder (13) with a piston (14) movable therein, and at least one passage (18) for transferring an air/fuel mixture from the crankcase to the cylinder. The engine is provided with at least one balance wheel (20) driven by the crankshaft and adapted to counteract vibrations caused by the movable parts of the engine. The wheel is provided with an axial opening (24) and adapted to cooperate with a sealing surface (23) surrounding the opening of the passage into the crankcase in such way that said passage (18) is alternately opened and closed by the balance wheel during rotation of the engine.

8 Claims, 6 Drawing Sheets

VALVE ARRANGEMENT FOR AN INTERNAL COMBUSTION ENGINE

BACKGROUND OF THE INVENTION

1. Field of the Invention

The present invention relates to a two-stroke engine comprising a crankcase with a crankshaft, a cylinder with a piston movable therein and at least one passage for transferring an air/fuel mixture from the crankcase to the cylinder, and at least one balance wheel driven by the crankshaft and adapted to counteract vibrations caused by the movable parts of the engine.

2. Description of the Related Art

It is well known in this field to use balance wheels or shafts for reducing vibrations in i. c. engines. A further problem is the reduction of the contents of harmful substances in the exhaust gases of the engine. A method of accomplishing this in a two-stroke engine is to reduce the scavenging losses, i.e. the amount of fresh combustion gas discharged with the exhaust gas during the scavenging procedure. The scavenging is normally controlled in that inlet and outlet ports are opened and closed by the piston during its movement in the cylinder. For controlling the scavenging procedure in a more appropriate manner than can be obtained by means of the piston movement it is known to use special valves which control the gas flow to and/or from the combustion chamber. Such devices, however, are relatively complicated and expensive to manufacture and have therefore not been used, to any larger extent in small engines used for example, in hand-held tools.

SUMMARY OF THE INVENTION

An object of the present invention is to provide a two-stroke engine in which it has been possible to solve the above-mentioned problems in an economically advantageous manner. This has been obtained by an engine of the kind mentioned in the introduction which according to the invention is generally characterized in that the balance wheel is provided with an axial opening and cooperates with at least one sealing surface surrounding the opening of the passage into the crankcase in such way that said passage is alternately opened and closed by the balance wheel during rotation of the engine.

BRIEF DESCRIPTION OF THE DRAWINGS

The invention will be described in more detail hereafter with reference to the accompanying drawings, wherein.

DETAILED DESCRIPTION OF THE PREFERRED EMBODIMENTS

Figure 1:
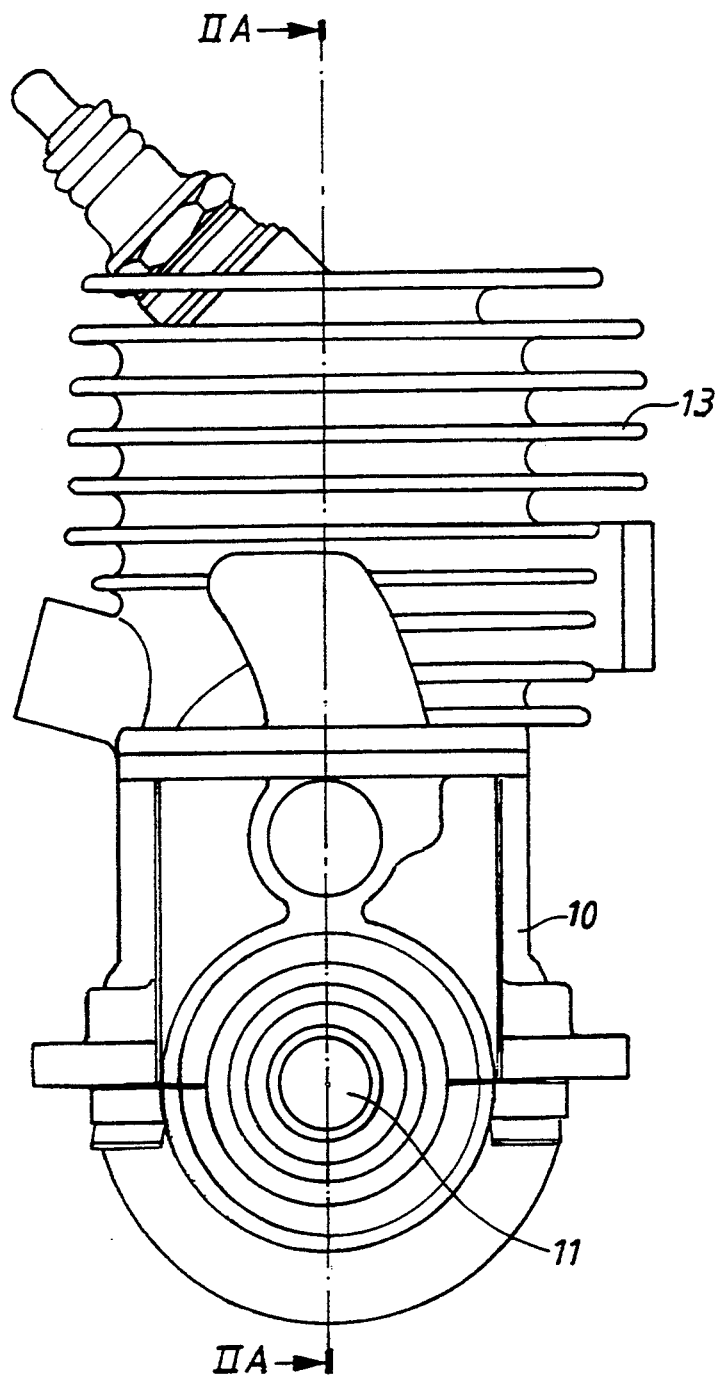
FIG. 1 illustrates a side elevation of a first embodiment of the engine according to the present invention.
Figure 2:
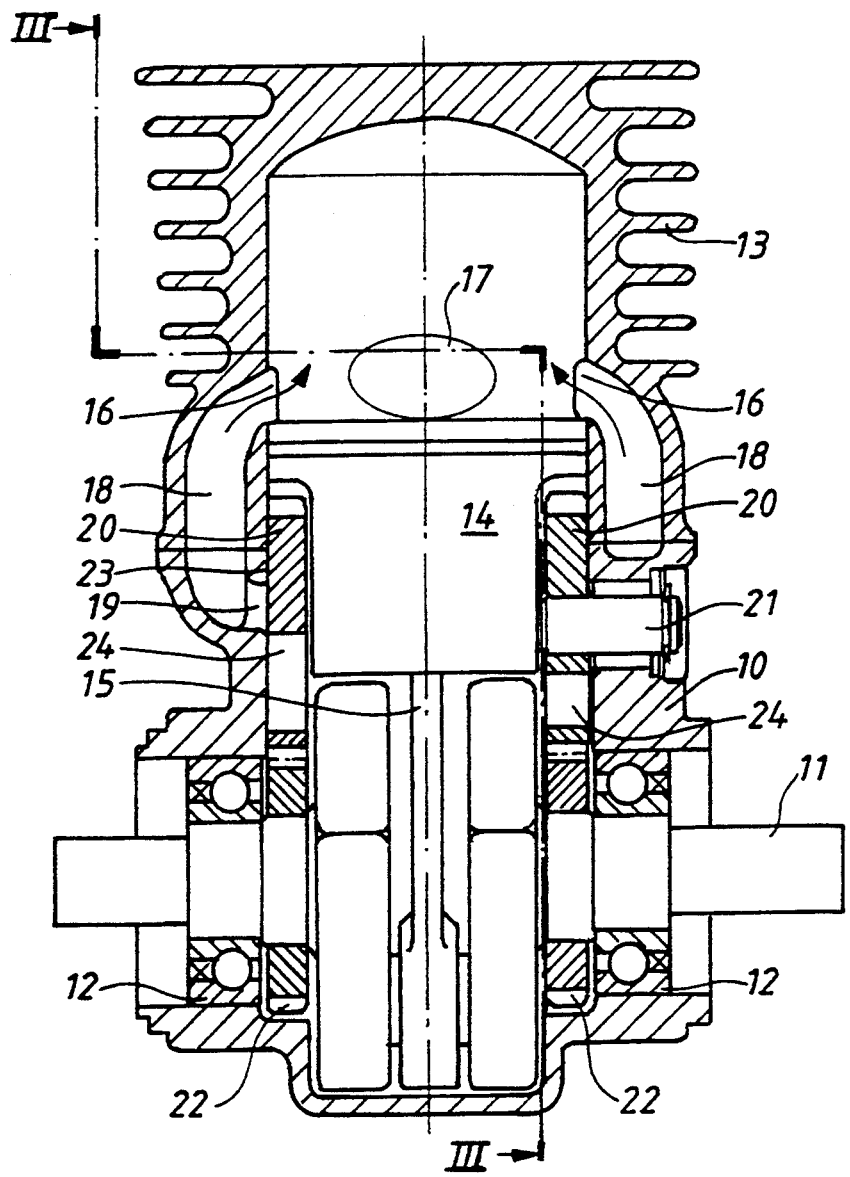
FIG. 2 illustrates a section of the engine illustrated in FIG. 1, wherein the right portion is a section along line IIA—IIA of FIG. 1, and the left portion is a section along line IIB—IIB of FIG. 3.
Figure 3:
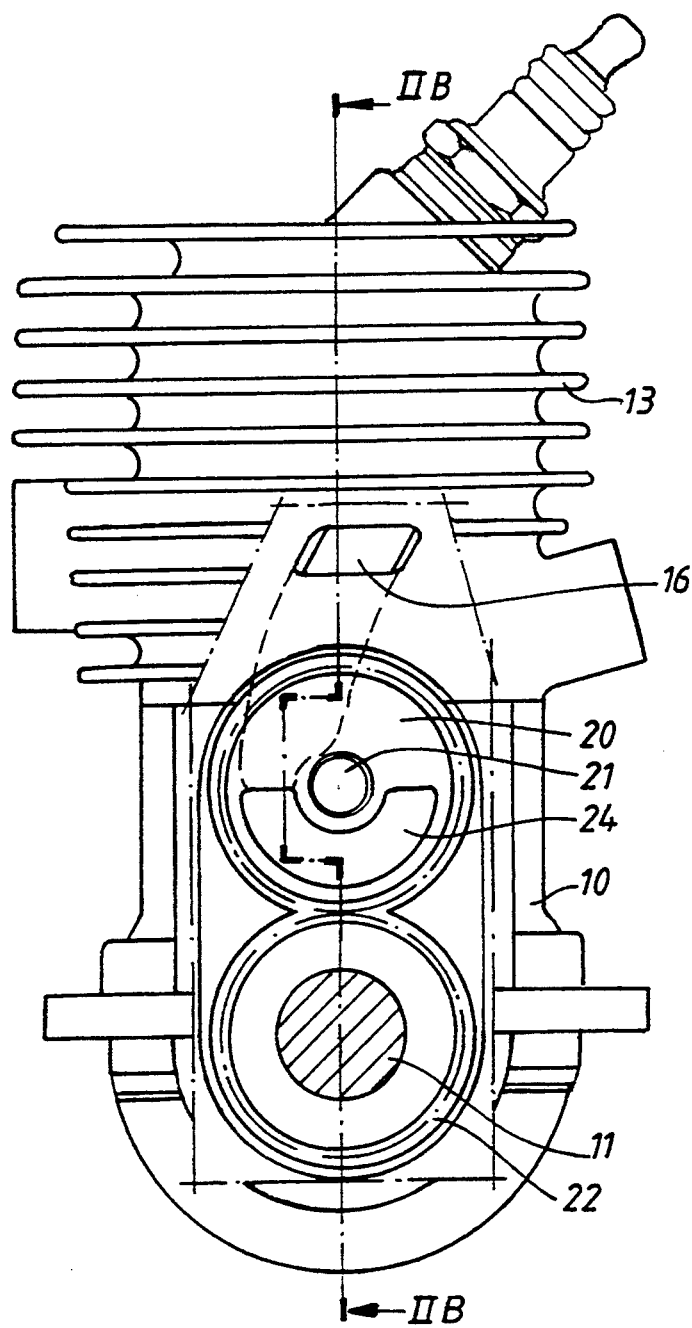
FIG. 3 illustrates a section along line III—III of FIG. 2.

The two-stroke engine of the first embodiment of the present invention shown in FIGS. 1-3 has a crankcase 10 with a crankshaft 11 journalled in the crankcase by means of bearings 12. The crankcase is attached to a cylinder 13 in which is provided a movable piston 14 connected to the crankshaft 11 by means of a connecting rod 15. The cylinder 13 is provided with two inlet ports 16 and an exhaust port 17. The piston is shown in its lower end position in which said ports are uncovered. The inlet ports 16 are connected via passages 18 to corresponding ports 19 in the crankcase.

As is best shown in FIG. 2, the engine is provided on each side with a balance wheel 20 which is journalled on a horizontal shaft 21. The balance wheels 20 are made as gears meshing with corresponding gears 22 attached to the crankshaft 11 whereby the balance wheels are caused to rotate together with the crankshaft but in the opposite direction. The side of the balance wheels facing outwards, which is flat, cooperates with corresponding sealing surfaces 23 surrounding the ports 19 through which the passages 18 open into the crankcase. The balance wheels are further provided with axial openings 24 which extend circumferentially over a sector of a half turn (FIG. 3). Primarily, this provides for an appropriate displacement of the center of gravity of the balance wheels for the purpose of balancing engine vibrations. Secondly, the balance wheels operate as valve means which during the rotation alternately cover and uncover the ports 19 of the passages 18.

In FIGS. 2 and 3 the balance wheels are shown in a position in which the connection between the crankcase and the passages 18 has just started to open. As the piston is in its lower end position with the inlet ports 16 of the cylinder fully uncovered, the initial stage of the scavenging procedure has thus been delayed. The time during which the scavenging takes place will thereby be more accurately defined which will contribute to reducing the scavenging losses in an advantageous manner. Due to the extension of the openings of the balance wheels the connection between the crankcase and the passages 18 will be kept open for more than a half revolution during the further rotation of the engine, and the scavenging will therefore be interrupted in the normal way in that the piston when moving upwards will cover the inlet ports 16 of the cylinder.

As is shown in the drawings, the shafts of the balance wheels are parallel to and disposed above the crankshaft at opposite sides of the of the cylinder axis. This position is advantageous for counteracting the lateral forces transmitted from the connecting rod via the piston to the cylinder during rotation of the engine.

Figure 4:
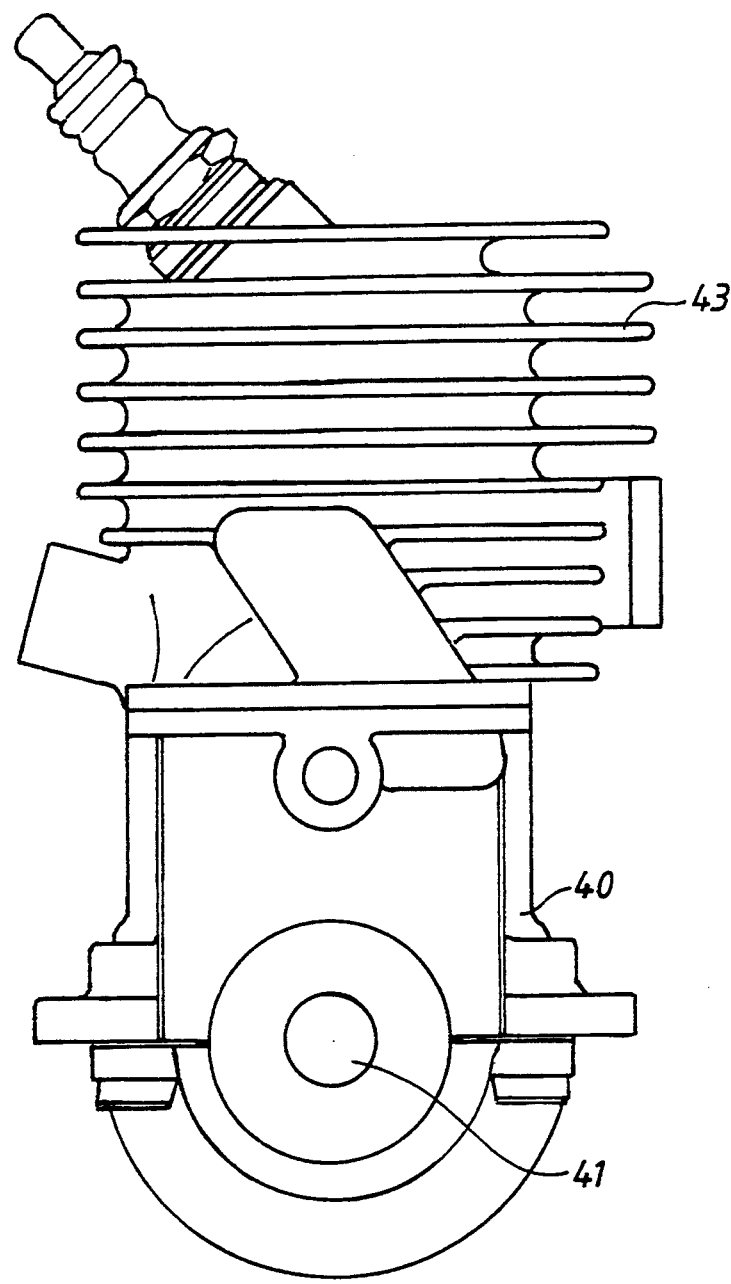
FIG. 4 illustrates a side elevation of a second embodiment of the engine according to the present invention.
Figure 5:
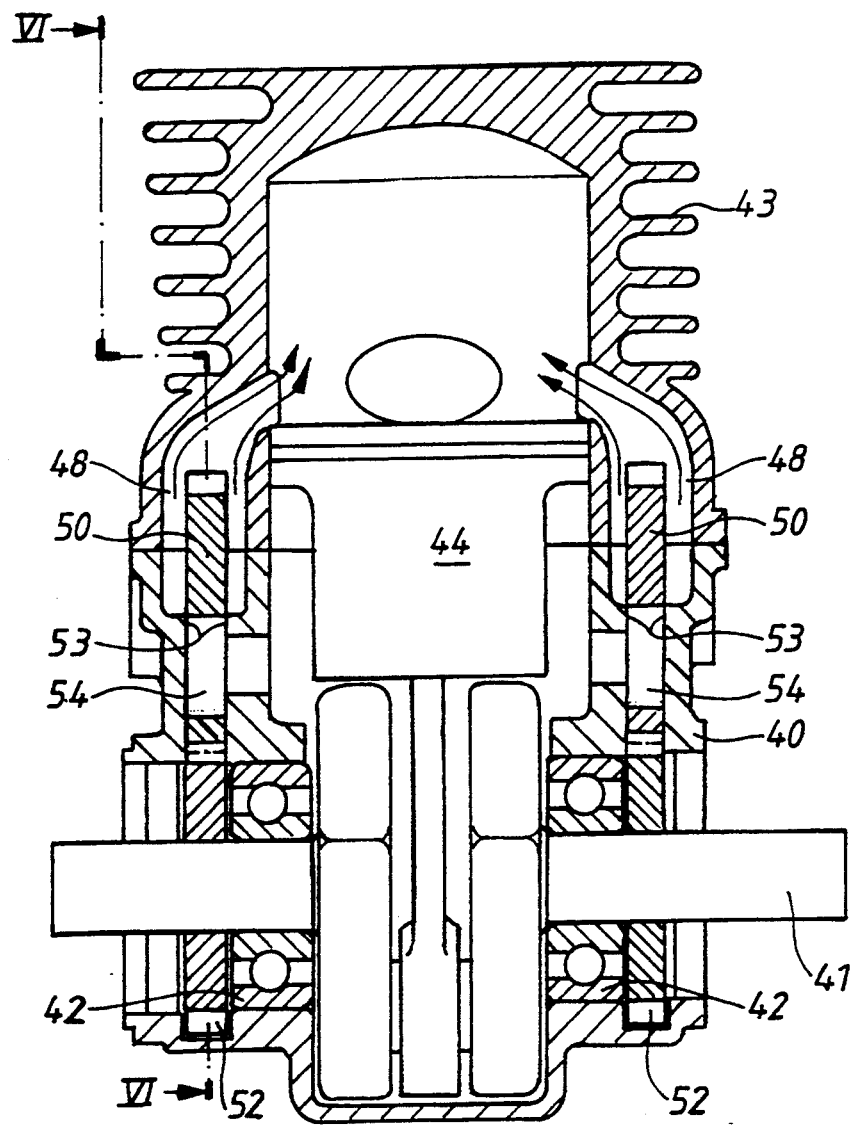
FIG. 5 illustrates a section along line V—V of FIG. 6.
Figure 6:
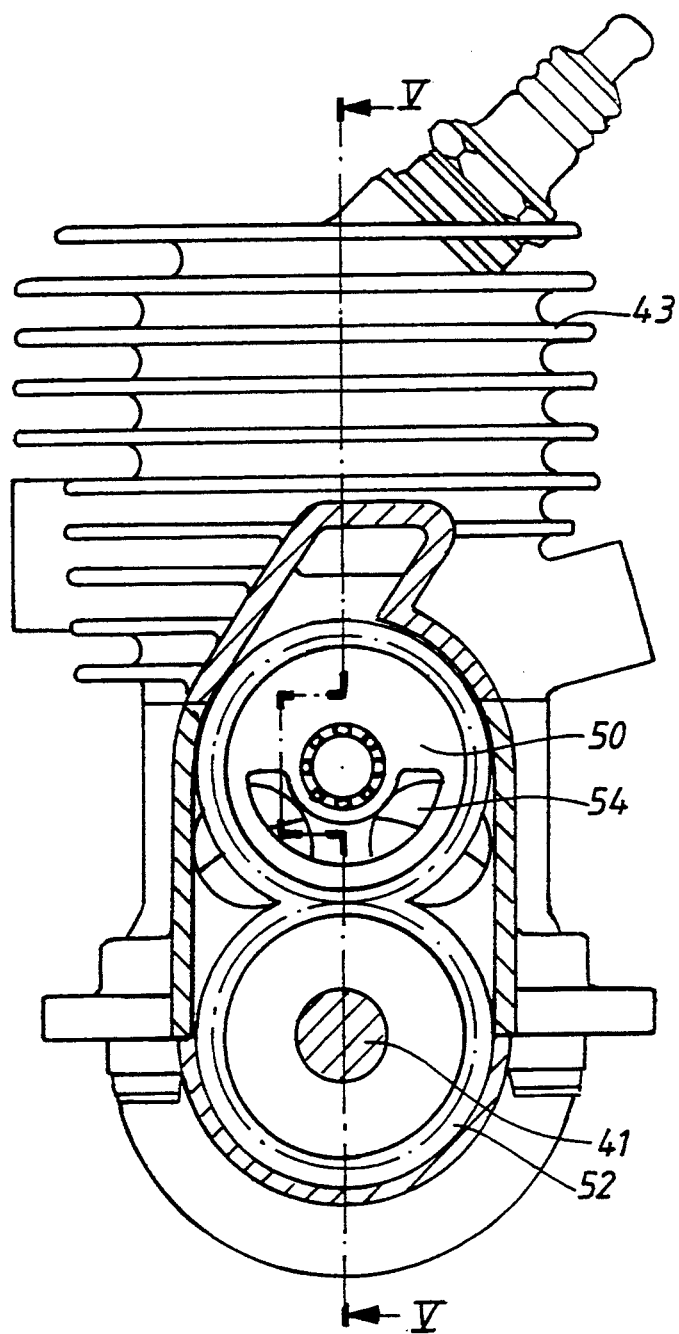
FIG. 6 illustrates a section along line VI—VI of FIG. 5.

In the second embodiment of the present invention shown in FIGS. 4–6, the crankshaft 41 has gears 52 provided outside the bearings 42 and meshing with balance wheels 50 which are generally equal to the balance wheels 20 described above. As is best shown in FIG. 5, the crankcase 40 and the cylinder 43 have a somewhat different design, the crankcase having sealing surfaces 53 cooperating with both sides of the balance wheels. The engine is shown with piston 44 in its lower end position in which the passages 48 between the crankcase and the cylinder are closed by the balance wheels which are in a position just before opening of the connection. As the rotation of the balance wheels continues and the connection is opened fresh gases flow from the crankcase through the openings 54 of the balance wheels into the passages 48 which extend on both sides of the balance wheels. The flow path is indicated by arrows in FIG. 5. Even in this embodiment the scavenging procedure is interrupted by the piston which on its way upwards closes the inlet ports of the cylinder.

I claim:

1. Two-stroke engine comprising a crankcase (10; 40) with a crankshaft (11; 41), a cylinder (13; 43) with a piston (14; 44) movable therein, at least one passage (18; 48) for transferring an air/fuel mixture from the crankcase to the cylinder, and at least one balance wheel (20; 50) separate from and driven by the crankshaft and adapted to counteract vibrations caused by movable parts of the engine, wherein the balance wheel is provided with an axial opening (24; 54) and cooperates with at least one sealing surface (23; 53) surrounding an opening of said passage (18) into the crankcase such that the passage is alternately opened and closed by the balance wheel during rotation of the engine.

2. Two-stroke engine according to claim 1, comprising two balance wheels (20; 50), said balance wheels being provided on mutually opposite sides of the engine.

3. Two-stroke engine according to claim 2, wherein the balance wheels are journalled on shafts (21; 51) provided on opposite sides of the cylinder and parallel to the crankshaft.

4. Two-stroke engine according to claim 3, wherein axes of rotation of the balance wheels (20; 50) at least approximately intersect a center axis of the cylinder (13; 43).

5. Two-stroke engine according to any of claims 1–4, wherein the balance wheels (20; 50) are made as gears intermeshing with corresponding gears (22; 52) provided on the crankshaft.

6. Two-stroke engine according to any of claims 1–4, wherein the opening (24; 54) of the balance wheel extends over a sector of about half a turn.

7. Two-stroke engine according to claim 6, wherein the balance wheel is adapted to open the passage (18; 48) when the piston (14; 44) is approximately at its lower end position.

8. Two-stroke engine according to any of claims 1–4, wherein the balance wheel is adapted to cooperate with sealing surfaces (53) provided in the crankcase (40) on each side of the balance wheel.

* * * * *